United States Patent
Nakanishi et al.

(10) Patent No.: US 9,482,814 B2
(45) Date of Patent: Nov. 1, 2016

(54) MULTICORE OPTICAL FIBER AND OPTICAL MODULE

(71) Applicant: SUMITOMO ELECTRIC INDUSTRIES, LTD., Osaka-shi, Osaka (JP)

(72) Inventors: Tetsuya Nakanishi, Yokohama (JP); Tetsuya Hayashi, Yokohama (JP); Takashi Sasaki, Yokohama (JP); Eisuke Sasaoka, Yokohama (JP)

(73) Assignee: Sumitomo Electric Industries, Ltd., Osaka-shi, Osaka (JP)

(*) Notice: Subject to any disclaimer, the term of this patent is extended or adjusted under 35 U.S.C. 154(b) by 0 days.

(21) Appl. No.: 14/945,570

(22) Filed: Nov. 19, 2015

(65) Prior Publication Data

US 2016/0070058 A1   Mar. 10, 2016

Related U.S. Application Data

(63) Continuation of application No. PCT/JP2014/083590, filed on Dec. 18, 2014.

(30) Foreign Application Priority Data

Dec. 18, 2013 (JP) ................................. 2013-261625

(51) Int. Cl.
*G02B 6/02* (2006.01)
*C03B 37/012* (2006.01)
(Continued)

(52) U.S. Cl.
CPC ..... *G02B 6/02042* (2013.01); *C03B 37/01222* (2013.01); *C03B 37/027* (2013.01);
(Continued)

(58) Field of Classification Search
None
See application file for complete search history.

(56) References Cited

U.S. PATENT DOCUMENTS

| 5,519,801 A | 5/1996 | Le Noane et al. |
| 6,917,742 B2* | 7/2005 | Po .................. G02B 6/032 385/123 |

(Continued)

FOREIGN PATENT DOCUMENTS

| JP | S54-38136 A | 3/1979 |
| JP | S55-133003 A | 10/1980 |

(Continued)

OTHER PUBLICATIONS

Tetsuya Hayashi, et al., "Design and fabrication of ultra-low cross-talk and low-loss multi-core fiber," Optics Express vol. 19, No. 17, 2011, pp. 16576-16592.

(Continued)

*Primary Examiner* — Mike Stahl
(74) *Attorney, Agent, or Firm* — Drinker Biddle & Reath LLP

(57) ABSTRACT

The present invention relates to an MCF with a structure for enabling an alignment work with higher accuracy. The MCF has a plurality of cores and a cladding. An outer peripheral shape of the cladding in a cross section of the MCF is comprised of a circumferential portion forming a circumference coincident with an outer periphery of the MCF, and a cut portion. The cut portion has a bottom portion and two contact portions provided on both sides of the bottom portion and projecting more than the bottom portion. When a side face of the MCF is viewed, the two contact portions have flattened faces and the flattened faces of the two contact portions extend along a longitudinal direction of the MCF with the bottom portion in between.

20 Claims, 14 Drawing Sheets

(51) Int. Cl.
*C03B 37/027* (2006.01)
*G02B 6/38* (2006.01)
*G02B 6/36* (2006.01)

(52) U.S. Cl.
CPC ......... *G02B6/02395* (2013.01); *G02B 6/3803* (2013.01); *G02B 6/3838* (2013.01); *C03B 2201/02* (2013.01); *C03B 2201/12* (2013.01); *C03B 2201/20* (2013.01); *C03B 2203/04* (2013.01); *C03B 2203/12* (2013.01); *C03B 2203/34* (2013.01); *G02B 6/3652* (2013.01); *G02B 6/3851* (2013.01)

(56) References Cited

U.S. PATENT DOCUMENTS

| | | | | |
|---|---|---|---|---|
| 8,457,462 | B2* | 6/2013 | Imamura | G02B 6/02338 385/126 |
| 2011/0229086 | A1 | 9/2011 | Bradley et al. | |
| 2015/0323736 | A1* | 11/2015 | Ishida | G02B 6/02042 385/126 |

FOREIGN PATENT DOCUMENTS

| | | | |
|---|---|---|---|
| JP | 56-12603 A | * | 2/1981 |
| JP | S56-12603 A | | 2/1981 |
| JP | S63-33102 U | | 3/1988 |
| JP | S63-120205 U | | 8/1988 |
| JP | 2003-156648 A | | 5/2003 |
| JP | 2006-189615 A | | 7/2006 |
| JP | 2008-534995 A | | 8/2008 |
| JP | 2010-286548 A | | 12/2010 |
| JP | 2010-286548 A | * | 12/2010 |
| JP | 2013-522680 A | | 6/2013 |
| JP | 2013-205557 A | | 10/2013 |
| WO | WO 2015/061207 A1 | * | 4/2015 |

OTHER PUBLICATIONS

Bogdan Rosinski, et al., "Multichannel Transmission of a Multicore Fiber Coupled with Vertical-Cavity Surface-Emitting Lasers," Journal of Lightwave Technology, vol. 17, No. 5, 1999, pp. 807-810.
English-language translation of International Preliminary Report on Patentability (IPRP) dated Jun. 30, 2016 that issued in WO Patent Application No. PCT/JP2014/083590.

* cited by examiner

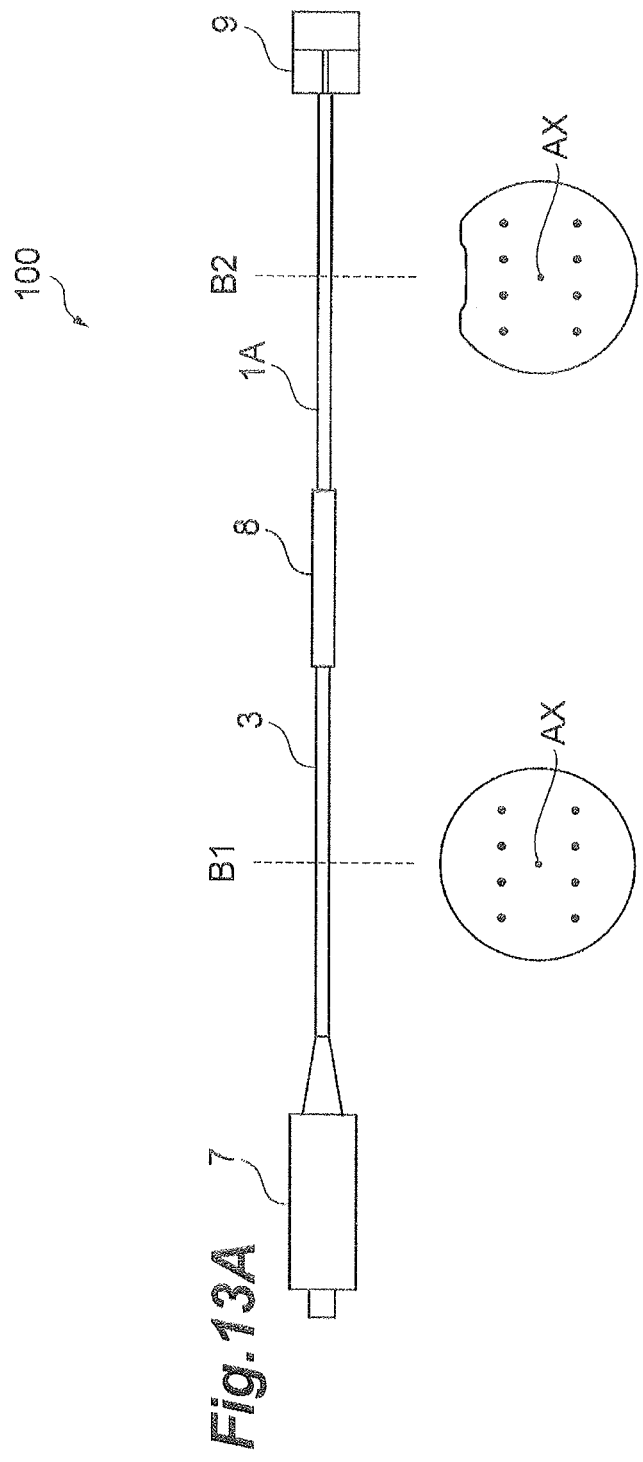

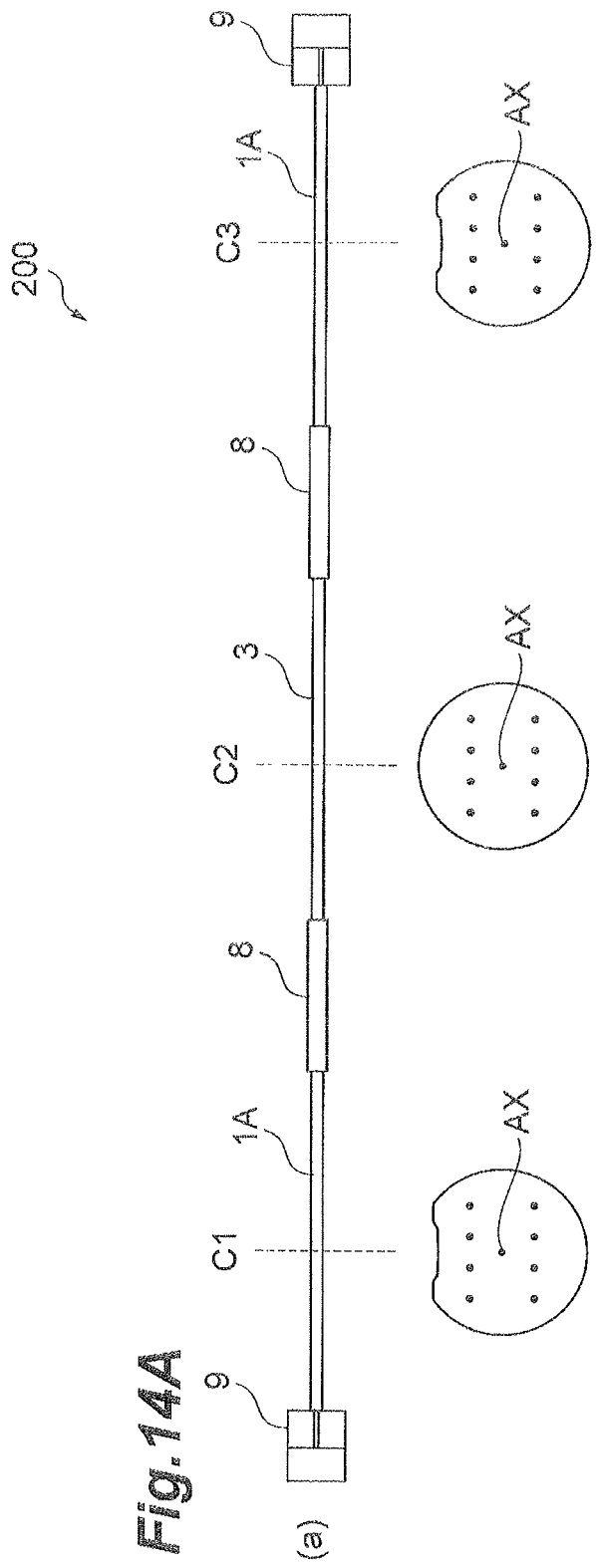

MULTICORE OPTICAL FIBER AND OPTICAL MODULE

CROSS-REFERENCE TO RELATED APPLICATIONS

This application is a continuation application of PCT/JP2014/083590 claiming the benefit of priority of the Japanese Patent Application No. 2013-261625 filed on Dec. 18, 2013, the entire contents of which are incorporated herein by reference.

TECHNICAL FIELD

The present invention relates to a multicore optical fiber (hereinafter referred to as MCF) and an optical module.

BACKGROUND ART

Various methods have been considered for suitably implementing positioning of the multicore optical fiber in which a plurality of cores each extending along a predetermined axis were covered by a common cladding. For example, Patent Literature 1 discloses the technology of processing a part of a cross-sectional shape of a preform into a flat shape and thereafter drawing the processed preform to manufacture the MCF with a cross section of a non-circular shape. It shows a method with this configuration to readily implement rotational alignment to a predetermined angular direction around a predetermined axis extending along the longitudinal direction of the MCF. Patent Literature 2 describes the MCF provided with a positioning structure wherein this positioning structure restricts rotation of the MCF around the predetermined axis extending along the longitudinal direction of the MCF. Furthermore, Non Patent Literature 1 describes the MCF in which four single-core optical fibers are integrated and the cross-sectional shape of which is non-circular.

CITATION LIST

Patent Literatures

Patent Literature 1: U.S. Pat. Published Application No. 2011/0229086
Patent Literature 2: Japanese Patent Application Laid-open Publication No. 2010-286548

Non Patent Literature

Non Patent Literature 1: Journal of Lightwave Technology, vol. 17, No. 5, p. 807-810 (1999)

SUMMARY OF INVENTION

Technical Problem

The Inventors conducted research on the conventional MCFs (multicore optical fibers) and found the problem as described below.

Specifically, the method described in Patent Literature 1 is one to process a part of the outer periphery of the preform into the flat shape and thereafter draw the processed preform. However, it is difficult to maintain the processed surface of the preform in the flat shape, because of the viscous flow of the preform, and the processed surface comes to have such curvature as to project in a central region. In this case, it is difficult to achieve accurate alignment even with use of such a processed surface. Patent Literature 2 discloses the configuration in which a cut portion is formed in the cladding, as the positioning structure. However, in the technology of Patent Literature 2, just as in the case of Patent Literature 1, accurate positioning may be difficult, due to deformation of the cut portion during processing. Furthermore, the method described in Non Patent Literature 1 is one to integrate four preforms each of which is a preform for manufacturing a single-core optical fiber, and thereafter draw the integrated preforms. In this case, the integrated preforms can deform during the operation of integrating the four preforms. As described above, it was still difficult to perform the alignment of the MCF with high accuracy.

The present invention has been accomplished in view of the foregoing, and it is an object of the present invention to provide a multicore optical fiber capable of being aligned with higher accuracy and an optical module using the multicore optical fiber.

Solution to Problem

An MCF (multicore optical fiber) according to the present invention comprises a plurality of cores and a cladding surrounding each of the plurality of cores. An outer peripheral shape of the cladding in a cross section perpendicular to a longitudinal direction of the MCF (coincident with an optical-axis direction of any one of the plurality of cores) is comprised of a circumferential portion forming an identical circumference (a circumference coincident with the outer periphery of the MCF in the cross section), and a cut portion (positioning portion having a stepped cross-sectional shape). In the cross section defining the outer peripheral shape of the cladding, the cut portion has a bottom portion and two contact portions provided on both sides of the bottom portion and projecting outward more than the bottom portion (or in a direction away from the cores more than the bottom portion). The two contact portions have respective flattened faces, when a side face of the MCF is viewed from a direction perpendicular to the longitudinal direction, and these flattened faces of the two contact portions extend along the longitudinal direction with the bottom portion in between.

More specifically, the outer peripheral shape of the cladding is a shape partly coincident with or approximate to a virtual circle with a diameter D [µm] equal to a maximum diameter of the MCF. The cut portion has a shape extending along a chord of the virtual circle with a central angle being an angle $\theta$ larger than $0°$ and smaller than $180°$ and the circumferential portion has a shape extending along an arc of the virtual circle with a central angle of $360°-\theta$. The bottom portion in the cross section defining the outer peripheral shape of the cladding has a shape extending along a direction from one end to the other end of the circumferential portion, and each of the flattened faces in the cross section defining the outer peripheral shape of the cladding has a shape extending along the direction from the one end to the other end of the circumferential portion. Furthermore, in the cross section defining the outer peripheral shape of the cladding, the bottom portion and the flattened faces constituting the cut portion are arranged so that a maximum separation distance between the bottom portion and the chord of the virtual circle is larger than a maximum separation distance between the flattened faces and the chord of the virtual circle. The flattened faces of the two contact portions may be arranged on the chord of the virtual circle.

An optical module according to the present invention is an optical module having a first MCF and an arrangement component provided at one end of the first MCF. The first MCF comprises a plurality of cores and a cladding surrounding each of the plurality of cores. The first MCF is characterized in that (1) an outer peripheral shape of the cladding in a cross section perpendicular to a longitudinal direction of the MCF (coincident with an optical-axis direction of any one of the plurality of cores) is comprised of a circumferential portion forming an identical circumference (a circumference coincident with an outer periphery of the first MCF in the cross section), and a cut portion, (2) in the cross section defining the outer peripheral shape of the cladding, the cut portion has a bottom portion and two contact portions provided on both sides of the bottom portion and projecting outward more than the bottom portion (or in a direction away from the plurality of cores), and (3) the two contact portions have respective flattened faces, when a side face of the MCF is viewed from a direction perpendicular to the longitudinal direction, and these flattened faces of the two contact portions extend along the longitudinal direction with the bottom portion in between. The arrangement component has a fixing member having a linear shape. The fixing member is in contact with the two contact portions, whereby the arrangement component fixes the first MCF so that an array direction of the plurality of cores in the first MCF is a predetermined direction.

Advantageous Effect of Invention

The present invention provides the MCF (multicore optical fiber) capable of being aligned with higher accuracy and the optical module using the MCF.

BRIEF DESCRIPTION OF DRAWINGS

FIGS. 13A to 13C are schematic configuration diagrams of an optical module using the MCF according to the embodiment of the invention.

FIGS. 14A to 14D are schematic configuration diagrams of an optical module using the MCFs according to the embodiment of the invention.

Figure 1:
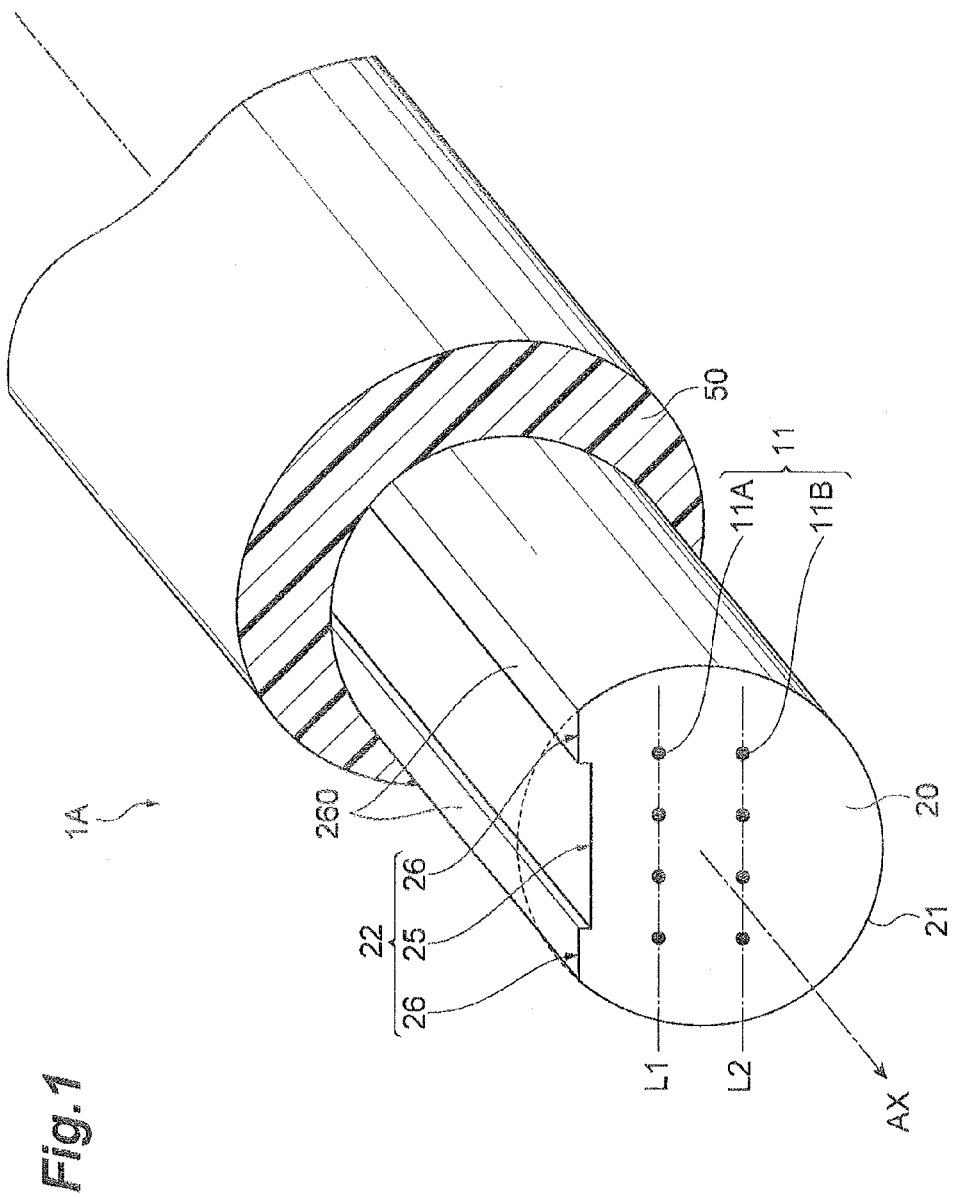
FIG. 1 is a schematic perspective view illustrating a configuration of the MCF according to the embodiment of the invention.

LIST OF REFERENCE SIGNS 1 (1A-1D, 1F), 2, and 3 MCFs (multicore optical fibers); 1E and 10 fiber preforms (multicore optical fiber preforms); 21 circumferential portion; 22 cut portion; 25 bottom portion; 26 contact portions; 260 flattened faces; 100 and 200 optical modules.

DESCRIPTION OF EMBODIMENTS

Description of Aspects of Embodiment of Invention

First, aspects of the embodiment of the invention will be described as enumerated below.

An MCF (multicore optical fiber) according to the embodiment of the invention has first to tenth aspects as described below.

(1) As a first aspect, the MCF according to the embodiment of the invention comprises a plurality of cores and a cladding surrounding each of the plurality of cores. An outer peripheral shape of the cladding in a cross section perpendicular to a longitudinal direction of the MCF is comprised of a circumferential portion forming a circumference coincident with an outer periphery of the MCF, and a first cut portion. In the cross section defining the outer peripheral shape of the cladding, the first cut portion has a bottom portion and two contact portions provided on both sides of the bottom portion and projecting outward more than the bottom portion. The two contact portions have respective flattened faces, when a side face of the MCF is viewed from a direction perpendicular to the longitudinal direction. These flattened faces of the two contact portions extend along the longitudinal direction of the MCF with the bottom portion in between. This configuration allows each of the two contact portions to be pressed by a fixing member, whereby the MCF can be stably fixed. Therefore, the rotational alignment can be performed with higher accuracy.

More specifically, the outer peripheral shape of the cladding is a shape partly coincident with or approximate to a virtual circle with a diameter D [μm] equal to a maximum diameter of the MCF. The first cut portion has a shape extending along a chord of the virtual circle with a central angle being an angle θ larger than 0° and smaller than 180°, and the circumferential portion has a shape extending along an arc of the virtual circle with a central angle of 360°−θ. The bottom portion in the cross section defining the outer peripheral shape of the cladding has a shape extending along a direction from one end to the other end of the circumferential portion, and each of the flattened faces in the cross section defining the outer peripheral shape of the cladding has a shape extending along the direction from the one end to the other end of the circumferential portion. Furthermore, in the cross section defining the outer peripheral shape of the cladding, the bottom portion and the flattened faces constituting the first cut portion are arranged so that a maximum separation distance between the bottom portion and the chord of the virtual circle is larger than a maximum separation distance between the flattened faces and the chord of the virtual circle.

(2) As a second aspect applicable to the above first aspect, in the cross section defining the outer peripheral shape of the cladding, a radius of curvature of each flattened face (more precisely, a line segment on the cross section corresponding to the flattened face) is preferably not less than 10 µm. When the radius of curvature is not less than 10 µm, it becomes feasible to implement stable fixing of the MCF by the fixing member.

(3) As a third aspect applicable to at least either one of the above first and second aspects, in the cross section defining the outer peripheral shape of the cladding, where a minimum value of core-core distance is defined as a_min and a minimum distance between the plurality of cores and the circumferential portion of the cladding is defined as d_min, they satisfy the following conditions: d_min≤a_min; and d_min/a_min≥0.3. When the core-core minimum distance and the core-cladding minimum distance satisfy these conditions, the intercore crosstalk and transmission loss in the MCF can be reduced.

(4) As a fourth aspect applicable to at least any one of the above first to third aspects, in the cross section defining the outer peripheral shape of the cladding, a separation distance between the two contact portions is preferably not less than 0.1×D, where D [µm] is a diameter of the circumferential portion (equal to a maximum diameter of the MCF). When the separation distance between the two contact portions falls within the foregoing range, it is feasible to effectively reduce occurrence of alignment deviation due to rotation around the predetermined axis along the longitudinal direction of the MCF.

(5) As a fifth aspect applicable to at least any one of the above first to fourth aspects, preferably, in the MCF a maximum value of intercore crosstalk in a transmission distance of 30 m is not more than −30 dB and a transmission loss due to a confinement loss is not more than 1 dB/km.

(6) As a sixth aspect applicable to at least any one of the above first to fifth aspects, on an outer peripheral surface of the cladding a second cut portion may be provided at a position separated by a predetermined distance from the first cut portion. The second cut portion may have the same structure as the first cut portion, or, may have a structure different from the first cut portion, for letting it function as a marker portion. When a plurality of cut portions (two or more cut portions) are provided on the outer peripheral surface of the cladding, it becomes feasible to achieve stable fixing of the MCF by a plurality of members.

(7) As a seventh aspect applicable to the above sixth aspect, preferably, the first and second cut portions are preferably arranged at positions where the first and second cut portions are not opposed to each other. In a configuration where three or more cut portions are provided on the outer peripheral surface of the cladding, these three or more cut portions are also preferably arranged at positions where they are not opposed to each other. When the plurality of cut portions are not opposed to each other, it becomes easy to distinguish the arrangement of the cores by the cut portions (because each of the cut portions can function as a marker portion).

(8) As an eighth aspect applicable to at least any one of the above first to seventh aspects, a radius of curvature of a fiber curl is preferably not less than 4 m. When the radius of curvature of the fiber curl is not less than 4 m, it becomes feasible to reduce influence of the fiber curl on the transmission characteristics of the MCF.

(9) As a ninth aspect applicable to at least any one of the first to eighth aspects, the MCF may comprise a coating provided on an outer peripheral surface of the cladding. An average thickness of the coating on the outer peripheral surface corresponding to the circumferential portion of the cladding is preferably not less than 20 µm and not more than 50 µm. When the average thickness of the coating is set in the range of 20 µm to 50 µm, it is feasible to avoid such inconvenience that it is difficult to distinguish the outer peripheral shape of the cladding from the outside because it is covered by the coating.

(10) As a tenth aspect applicable to at least any one of the above first to ninth aspects, the MCF may have a marker portion to identify an arrangement of the cores, in the cladding portion. When the marker portion is provided, the arrangement of the cores can be readily distinguished, for example, even if the cross-sectional shape of the MCF is rotationally symmetric.

An optical module according to the embodiment of the invention has eleventh to eleventh aspects as described below.

(11) As an eleventh aspect, the optical module has a first MCF and an arrangement component provided at one end of the first MCF. The first MCF may have the same structure as the MCF according to at least any one of the above first to tenth aspects. Specifically, the first MCF comprises a plurality of cores and a cladding surrounding each of the plurality of cores. The first MCF is characterized in that an outer peripheral shape of the cladding in a cross section perpendicular to a longitudinal direction of the first MCF is comprised of a circumferential portion forming a circumference coincident with an outer periphery of the first MCF, and a cut portion. In addition, the first MCF is characterized in that in the cross section defining the outer peripheral shape of the cladding, the cut portion has a bottom portion and two contact portions provided on both sides of the bottom portion and projecting in a direction away from the plurality of cores more than the bottom portion (or toward the outside of the MCF). Furthermore, the first MCF is also characterized in that the two contact portions have respective flattened faces, when a side face of the first MCF is viewed from a direction perpendicular to the longitudinal direction, and these flattened faces of the two contact portions extend along the longitudinal direction of the first MCF with the bottom portion in between. The arrangement component has a fixing member having a linear shape. The fixing member is in contact with the two contact portions, whereby the arrangement component fixes the first MCF so that an array direction of the cores in the first MCF is a predetermined direction. Since in the optical module the first MCF has the two contact portions, the two contact portions can be pressed by the fixing member of the arrangement component. For this reason, it becomes feasible to achieve the alignment with high accuracy.

(12) As a twelfth aspect applicable to the above eleventh aspect, the optical module comprises a second MCF connected to the other end different from the one end of the first MCF. Furthermore, in a cross section perpendicular to an optical-axis direction of any one of the plurality of cores in the second MCF, an outer peripheral shape of the second MCF is preferably circular. When the second MCF is circular as in this case, it is also easy to perform connection to an optical component to which the MCF of the circular shape is suitably applied, e.g., a ferrule or the like. In addition, it becomes feasible to reduce cost for processing of the MCF.

Details of Embodiment of Invention

Specific examples of the MCF (multicore optical fiber) and the method for manufacturing the MCF according to the present invention will be described below with reference to the drawings. It should be noted that the present invention is by no means intended to be limited to these examples presented by way of illustration but is intended for inclusion of all changes within the meaning and scope of equivalency to the scope of claims, as described in the scope of claims.

FIG. 1 is a schematic perspective view of MCF 1A according to the present embodiment. The MCF 1A has eight cores 11 and a cladding 20 surrounding each of the cores 11. The cores 11 extend in a direction along a predetermined axis AX. In the present specification, the predetermined axis AX refers to an axis extending along the longitudinal direction of the MCF in each embodiment and central axis of the MCF in a state in which the cladding has an outer peripheral shape without any cut portion, which means a virtual central axis for the MCF in each embodiment. In the MCF of each embodiment the optical-axis directions of the cores are coincident with the direction along the predetermined axis AX (or the longitudinal direction of the MCF).

The MCF 1A may have a jacket portion (coating) 50 provided on the outer peripheral surface of the cladding 20. More specifically, the cladding 20 is comprised of a plurality of optical claddings each of which covers one core 11, and a physical cladding covering each of the optical claddings. A region called the "physical cladding" refers to a region separated from each of the cores 11 in the cladding, which is defined as a region farther than a position where the distance from the center position of each core 11 is 5/2 times MFD (mode field diameter) at an operating wavelength, or, farther than a position where the amplitude of the electric field becomes not more than $10^{-4}$ from its peak value.

The refractive index of each core 11 is higher than that of the cladding 20. In general, the shape of a refractive index profile of each core in the MCF can take any refractive index structure that can be considered by a person skilled in the art, for setting the transmission characteristics such as the intercore crosstalk and confinement loss at proper values, e.g., the step type, GI type, W type, trench type, and so on. The design principles to properly set the intercore crosstalk, the confinement loss, and others of the MCF are theoretically clarified; for example, as to the intercore crosstalk, reference can be made to Optics Express Vol. 19, Iss. 17, pp. 16576-16592. The propagation constants of the respective cores 11 in the MCF 1A may be identical with or different from each other. The MCF 1A may be an uncoupled multicore optical fiber which performs transmission through separate channels of the respective cores 11, or may be a coupled multicore optical fiber which performs transmission through super channels across the plurality of cores.

The cores 11 and cladding 20 consist primarily of silica-based glass and are doped with an impurity for adjustment of refractive index as occasion may demand. For example, each of the eight cores 11 can be silica-based glass doped with $GeO_2$ and the cladding 20 can be pure silica glass. As another example, each of the eight cores 11 can be pure silica glass and the cladding 20 can be silica-based glass doped with element F or element Cl. The respective core diameters of the eight cores 11 may be identical or different. The respective refractive indices of the eight cores 11 may be identical or different.

The cores 11 in the MCF 1A are arranged in two rows in a cross section perpendicular to the predetermined axis AX (the longitudinal direction of the MCF 1A). Namely, four cores 11A out of the eight cores 11 are arranged at equal intervals along a straight line L1. The remaining four cores 11B out of the eight cores 11 are arranged at equal intervals along a straight line L2. The straight line L1 and the straight line L2 are parallel to each other.

In the MCF 1A, the outer peripheral shape of the cladding in the cross section perpendicular to the optical-axis direction of any one of the cores 11 (coincident with the longitudinal direction of the MCF extending along the predetermined axis AX) includes a circumferential portion 21 forming an identical circumference (a circumference coincident with the outer periphery of the MCF 1A), and a cut portion 22 cut inward from the circumferential portion 21 toward the predetermined axis AX. The cut portion 22 means a portion corresponding to a positioning portion having a stepped cross-sectional shape. The predetermined axis AX means an axis corresponding to a virtual central axis of the cross section (approximate circle) of the MCF without formation of the cut portion 22. The identical circumference means a single circumference including all the cores, not each single one, and the circumferential portion forming the identical circumference also includes a plurality of portions separated by a plurality of cut portions within the single circumference. The cur portion 22 is comprised of a bottom portion 25 and contact portions 26 provided on both sides of the bottom portion 25 and projecting outward more than the bottom portion 25. The cut portion 22 comprised of the bottom portion 25 and the contact portions 26 is formed so as to extend in the longitudinal direction of the MCF 1A. A characteristic point in the MCF 1A of the present embodiment is that the two contact portions 26 are provided as separated at positions not included in the circumferential portion 21 forming the identical circumference. The contact portions 26 are used for being supported by a fixing member or the like during alignment of the MCF 1A. Therefore, the bottom portion 25 between the two contact portions 26 needs to be located at the position lower than (inside) the contact portions 26.

Figure 2:
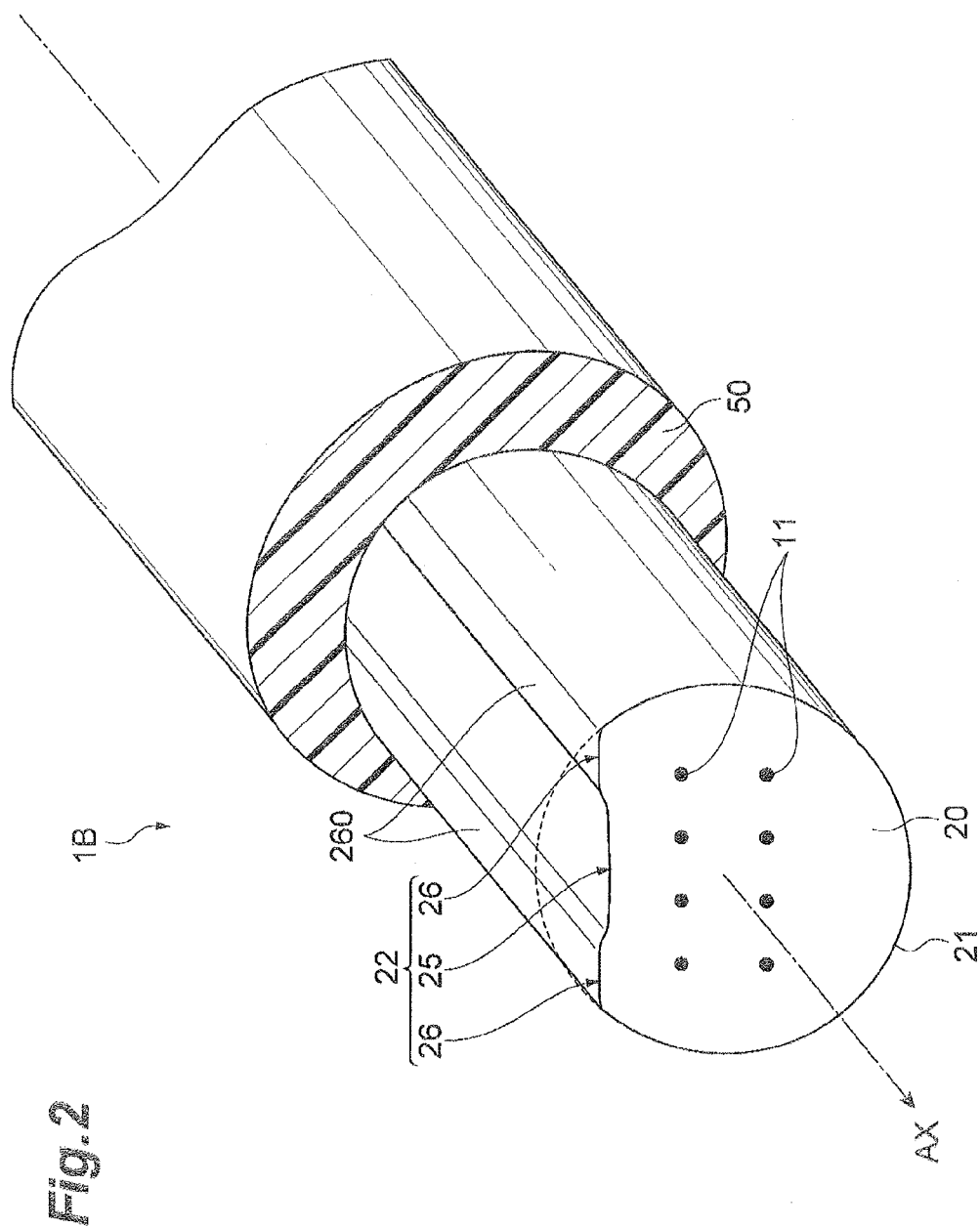
FIG. 2 is a schematic perspective view illustrating a second configuration of the MCF according to the embodiment of the invention.
Figure 3:
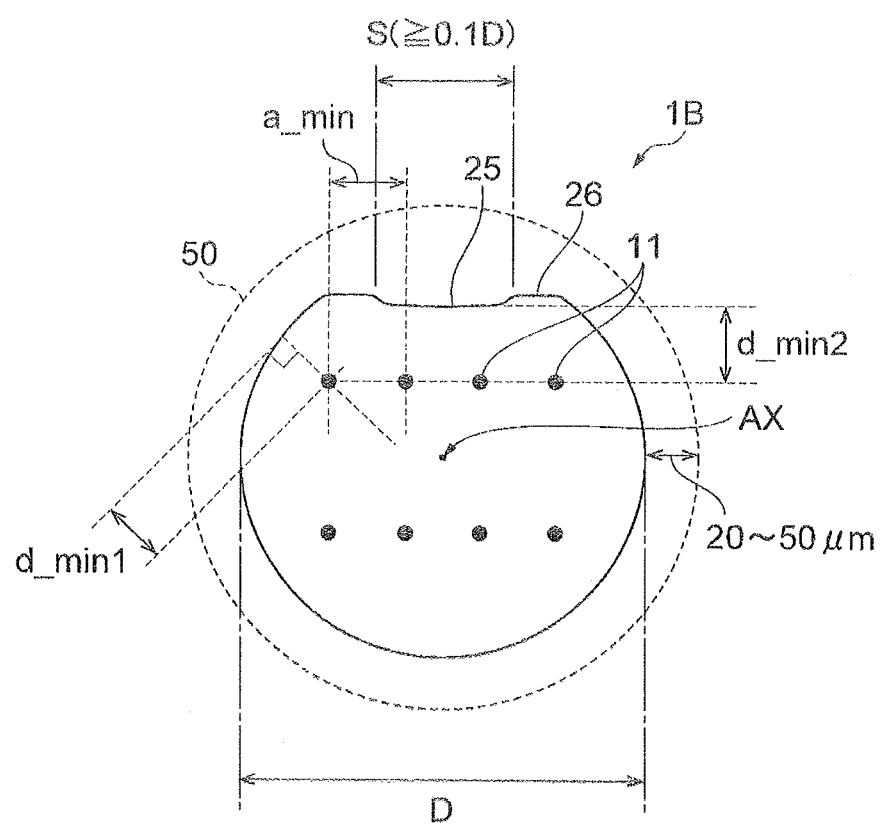
FIG. 3 is a drawing illustrating a_min, d_min, and d in the MCG according to the embodiment of the invention.

The contact portions 26 have respective flattened faces 260 (faces extending along the longitudinal direction of the MCF 1A with the bottom portion 25 in between), whereby the MCF 1A can be stably supported by the fixing member or the like. The "flattened face" stated herein also includes a surface formed of a gently sloping face or gently sloping faces. For example, particularly, the contact portions 26 may be faces forming gentle curves, as in MCF 1B shown in FIG. 2. FIG. 3 is a drawing showing a cross-sectional structure of the MCF 1B shown in FIG. 2. In this case, the radius r of curvature of the contact portions 26 is preferably not less than 10 μm. The radius r of curvature can be controlled by manufacturing conditions of the MCF (mainly, by grinding and polishing conditions of a multicore optical fiber preform). This will be described later. The multicore optical fiber preform will be referred to hereinafter simply as "fiber preform."

A more specific sectional shape of the MCF according to the present embodiment as described above, i.e., the outer peripheral shape of the cladding 20 will be described using FIGS. 4A and 4B. The below will describe the MCF 1B in FIG. 2, as an example.

Figure 4A:
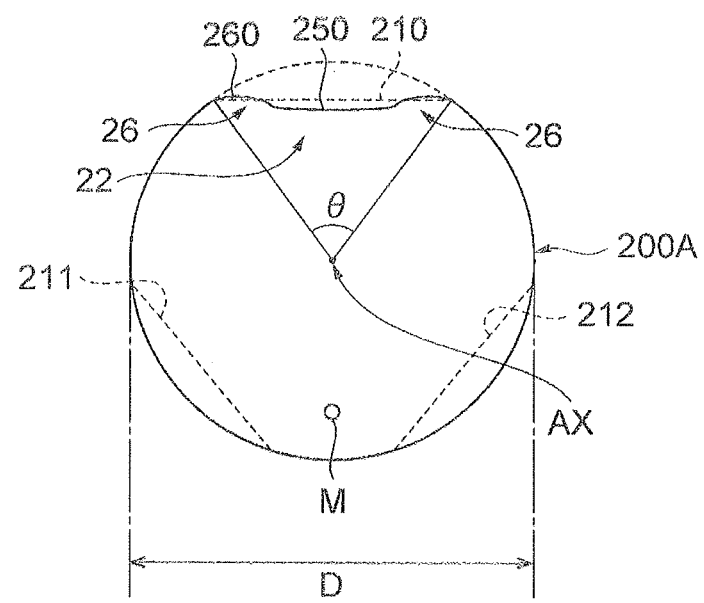
FIGS. 4A and 4B are drawings for illustrating a cross-sectional shape in the MCF according to the embodiment of the invention in detail.

The outer peripheral shape of the cladding 20 in the cross section perpendicular to the predetermined axis AX is a shape partly coincident with or approximate to a virtual circle with a diameter D [μm] equal to a maximum diameter of the MCF 1B, as shown in FIG. 4A. The cut portion 22 has a shape extending along a chord 210 of the virtual circle with a central angle being an angle θ larger than 0° and smaller than 180°. The circumferential portion 21 has a shape extending along an arc 200A of the virtual circle with a central angle of 360°−θ. In the cross section defining the outer peripheral shape of the cladding, the bottom portion 25 forming a part of the cut portion 22 corresponds to a line segment 250 having a shape extending along a direction from one end to the other end of the arc 200A corresponding to the circumferential portion 21. Each of the flattened faces 260 of the contact portions 26 forming parts of the cut portion 22 has a shape extending along the direction from the one end to the other end of the arc 200A. Furthermore, in the cross section defining the outer peripheral shape of the cladding 20, as shown in FIG. 4B, the bottom portion 25 and the flattened faces 260 constituting the cut portion 22 are arranged so that a maximum separation distance S1 between the bottom portion 25 (line segment 250) and the chord 210 of the virtual circle is larger than a maximum separation distance S2 between the flattened faces 260 and the chord 210 of the virtual circle.

Figure 4B:
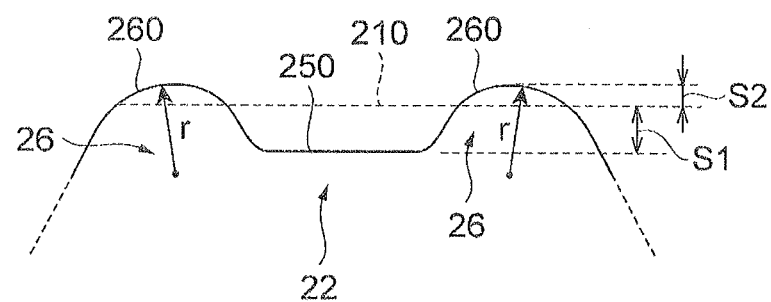

The radius r of curvature of the flattened faces 260, as shown in FIG. 4B, is defined on the cross section of the MCF 1B perpendicular to the predetermined axis AX (virtual central axis) extending along the longitudinal direction of the MCF 1B. If a plurality of cut portions 22 are formed in the MCF 1B along the longitudinal direction of the MCF 1B, the plurality of cut portions 22 can be formed as separated by a predetermined distance and along respective chords with the central angle θ in the virtual circle (with the center AX and diameter D). For example, in the example of FIG. 4A, three cut portions 22 are formed along respective chords 210, 211, and 212 with the central angle θ in the virtual circle (with the center AX and diameter D).

The outer diameter (maximum diameter) of the MCF 1A or 1B is preferably as small as possible, in terms of degradation of mechanical strength and increase of cost. However, reduction in diameter of the MCF could increase the inter-core crosstalk. The distance between the cores 11 against intercore crosstalk is calculated based on the refractive index profile structure of the cores 11 applied. Here, let a_min be a minimum core pitch necessary for keeping the intercore crosstalk constant, as shown in FIG. 3. By setting the thickness d of the cladding 20 necessary and sufficient for suppressing the confinement loss, it becomes unnecessary to set the outer diameter of the MCF larger than necessary. A minimum value d_min1 of the distance between the core 11 and the outer periphery of the cladding 20 is set to satisfy a relation of d_min1=d. Similarly, a distance d_min2 between the bottom portion 25 and the cores 11 is also preferably set to satisfy a relation of d_min2=d. This can suppress the intercore crosstalk and confinement loss and allows the outer diameter (maximum diameter) of the MCF to be designed smaller. The necessary and sufficient thickness d of the cladding is desirably set so that the confinement loss at an operating wavelength is not more than 1 dB/km and, more desirably, not more than 0.1 dB/km, for the refractive index structure of the cores 11 applied.

On the other hand, if d_min/a_min is set too small, the confinement loss will become too large. Therefore, d_min/a_min is preferably not less than 0.3.

The minimum core pitch is preferably set so that the intercore crosstalk becomes not more than −30 dB in a length of the MCF in use (for example, in the transmission distance of 30 m).

When the minimum distance between the bottom portion 25 and cores 11 is denoted by d, as shown in FIG. 3, the confinement loss can be fully suppressed when d/a_min is set not more than 1. For this reason, it is feasible to realize a core arrangement with high space utilization efficiency.

However, if d/a_min is set too small, the confinement loss will become too large. For this reason, d/a_min is desirably not less than 0.3.

When the separation distance between the two contact portions (the length of the bottom portion 25) is short, the fiber becomes easy to move with a rotational torque in the cross section. In this case, rotational alignment deviation becomes more likely to occur in an operation of mounting the fiber on an optical component. From the viewpoint of the viscous flow during drawing, it is difficult to maintain the shape, if the two contact portions 26 are located in proximity.

The MCF tends to cause the rotational alignment deviation with increase in diameter of its cross section. For this reason, the separation distance between the two contact portions 26 is desirably as large as possible. When the diameter (maximum diameter) of the MCF is denoted by D [μm], the rotational alignment deviation can be suppressed and manufacture becomes easy by employing 0.03×D as the separation distance between the contact portions 26. The separation distance between the contact portions 26 is more preferably 0.05×D and still more preferably 0.1×D.

For ensuring sufficient reliability against bending strain of the MCF, the minimum diameter in the cross section is not more than 250 μm, more preferably not more than 200 μm, and still more preferably not more than 150 μm. When this configuration is adopted, it is feasible to fully decrease the transmission loss due to the confinement loss dependent on the thickness of the cladding, while suppressing the crosstalk dependent upon the core pitch. For example, the transmission loss can be made not more than 1 dB/km.

The MCF can achieve an increase in space utilization efficiency per cross-sectional area. For this reason, it is expected to be applied to intra-device and inter-device short-haul interconnections and the like. Particularly, in view of application to the intra-device interconnections, the radius R of curvature of the MCF can be 5 mm or 3 mm. When the bending loss at an operating wavelength in such a radius of curvature is set not more than 0.5 dB/turn, the MCF can be housed in a small space.

The number of cut portions 22 provided in the MCF does not have to be limited to one. For example, it is also possible to adopt a mode in which two cut portions 22 are formed in the MCF. In this case, however, the two cut portions 22 need to be located as separated from each other along the outer periphery of the MCF cross section.

If the cross section of the MCF has a rotationally symmetric shape throughout the entire length, it will be difficult to discriminate the cores in a rotational alignment work. Therefore, when the cut portions 22 are located at positions where they are not opposed to each other, so as to make the shape of the outer periphery asymmetric, it becomes easier to identify each of the cores. In the case of the MCF having a common rotationally-symmetric core arrangement on its cross section, a marker is used in the form of a hollow space, glass with the refractive index different from that of the jacket portion, or the like for identifying each of the cores. In contrast to it, the present embodiment employs the asymmetric arrangement of the cut portions 22, whereby each of the cores can be identified by relative positions of the respective cores to the outer peripheral shape of the MCF cross section (i.e., the cut portions 22 per se function as marker portion). If the cut portions 22 are located at rotationally symmetric positions in the cross section of the MCF, it is preferred to provide a marker portion to allow some distinction, for example, by changing the cross-sectional shapes of the cut portions or the like (e.g., the lengths of the cut portions 22 or the shapes of the bottom portions). In the example of FIG. 4A, a viewable marker portion M is buried, for example, in the cladding 20. The marker portion M is preferably provided in a region called the physical cladding because it, if provided near the cores, could possibly affect light propagation characteristics.

The following will describe a method for manufacturing the MCF 1A. First, a fiber preform with a plurality of cores provided inside is prepared and processed for a part corresponding to the cut portion 22, by use of the grinding and polishing technologies. At this time, a straight line connecting portions corresponding to the two contact portions 26 of the cut portion 22 is preferably formed in parallel with the array directions of the cores arranged in proximity (e.g., the directions L1 and L2 in FIG. 1). For example, if an angle x° is desired to be made between the array directions of the cores and the straight line connecting the portions corresponding to the two contact portions 26 of the cut portion 22, it is desirable to grind the portion corresponding to the cut portion 22, so as to make the angle between them fall within the range of x±0.50. This portion is more preferably ground in a condition of x±0.2°. At this stage, the processed shape of the fiber preform can be ground, for example, like the MCF 1A shown in FIG. 1. It is also possible to grind only a region corresponding to the bottom portion 25, without grinding regions corresponding to the contact portions 26.

Another applicable method for manufacturing the fiber preform is a rod-in-collapse method of boring a jacket glass material in which regions corresponding to the two contact portions 26 are preliminarily formed in its outer periphery, in a desired core constellation, inserting core rods into respective holes thus formed, and collapsing them. Instead of the rod-in-collapse method, it is also possible to use a sand cladding method of arranging a plurality of cores in a desired core constellation inside a glass pipe of a predetermined shape, filling gaps in the glass pipe with silica sand, and sintering the resultant. It is also possible to use a stack method of filling a vacant space with glass rods and drawing the resultant. As described above, the fiber preform manufacturing method can be selectively used from the foregoing processes in accordance with required production accuracy.

The cores applicable to the present embodiment can be manufactured by a well-known vapor phase glass synthesis method such as VAD (Vapor Phase Axial. Deposition), OVD (Outside Vapor Deposition), MCVD (Modified Chemical Vapor Deposition), or PCVD (Plasma-activated Chemical Deposition). An optical cladding layer is provided between the cores and the physical cladding by VAD, OVD, MCVD, the rod-in-collapse method, or a method similar to the foregoing.

Next, the fiber preform manufactured by the above method is drawn. Specifically, in a drawing device 5 shown in FIG. 5, the fiber preform 10 in which a stepped region 220 corresponding to the cut portion 22 is formed is set in a work furnace 51. On that occasion, the leading end portion of the fiber preform 10 is heated to a temperature not less than a work point to soften. The leading end portion thus softening is adequately stretched to draw the fiber preform 10 into the MCF (glass portion). At this time, the glass outer diameter of the MCF thus drawn is measured with an outer diameter monitor 52 and the outer diameter is controlled based on the result of the measurement. During the period of this outer diameter control, a coated multi-core optical fiber with a coating 50 on an outer peripheral surface of the glass portion is formed through dies 53, 55 for attaching resin, UV furnaces 54, 56 for curing the resin, and others, and the coated multi-core optical fiber thus formed is wound up onto a winding bobbin. In the drawing device 5 shown in FIG. 5, for providing the coating 50 on the outer peripheral surface of the glass portion, the step of attaching the resin by the die and then curing it is repeated twice (via die 53 to UV furnace 54 and die 55 to UV furnace 56).

In drawing the fiber preform 10 in which the non-circular region 220 (the stepped region corresponding to the cut portion 22 functioning as a positioning portion) is formed in part of the outer periphery defining the cross section as in the present embodiment, the glass under the drawing could rotate because the glass diameter varies angle by angle. In this case, the rotation will cause variation in the outer diameter measured by the outer diameter monitor 52, and therefore it is difficult to manufacture the MCF having the uniform cores throughout the axial direction.

For manufacturing the MCF with the outer diameter uniform, the manufacturing device is desirably equipped with a mechanism for measuring the outer diameter from a plurality of angles in the outer diameter monitor 52, in the manufacturing method of the MCF according to the present embodiment.

Figure 6:
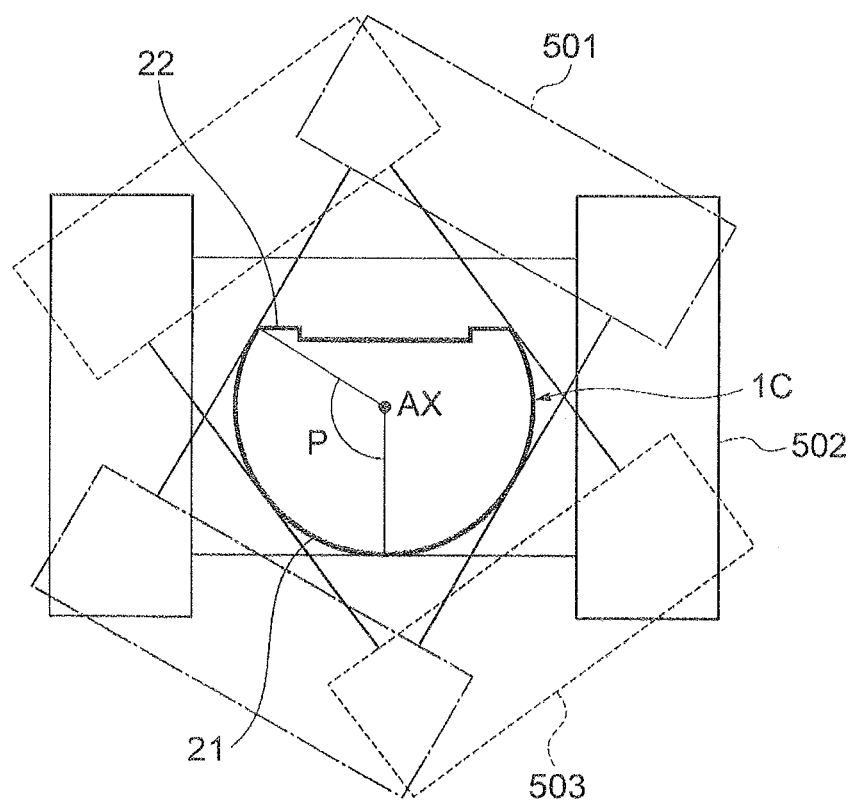
FIG. 6 is a drawing illustrating an arrangement of an outer diameter monitor.
Figure 7:
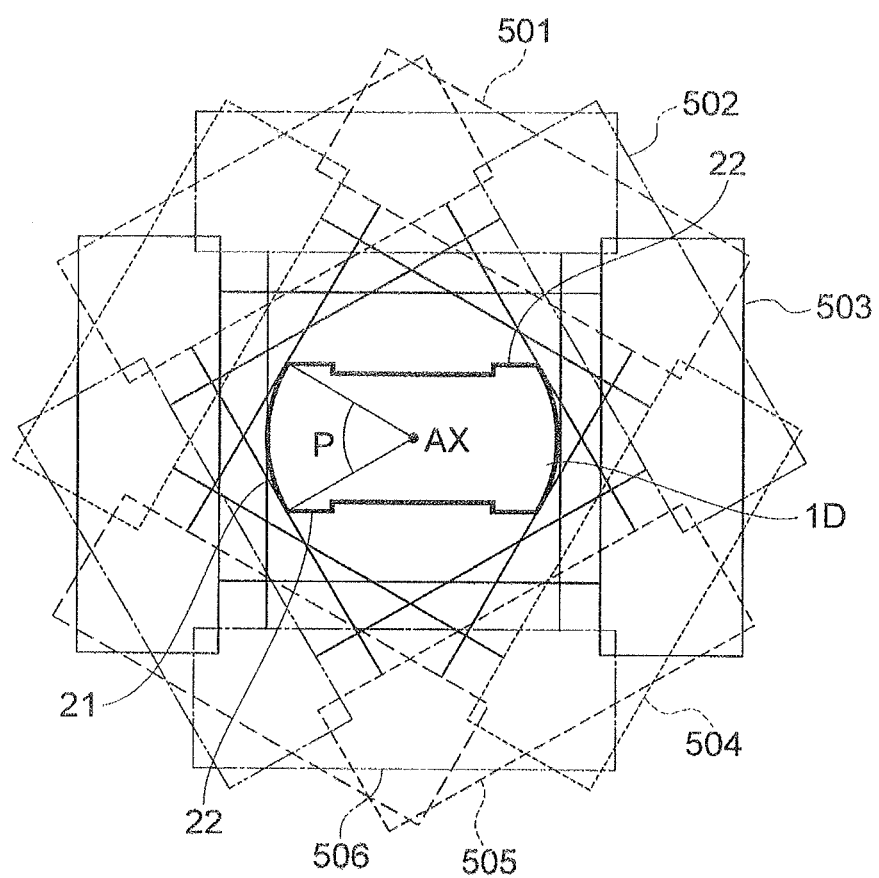
FIG. 7 is a drawing illustrating another arrangement of the outer diameter monitor.

The below will describe an example of the outer diameter measuring method, using FIGS. 6 and 7. First, in the case where there is one cut portion 22, as shown in FIG. 6, let us define an angle P [°] as an angle from an intersection between the cut portion 22 and the circumferential portion 21 to a lowest point. When there are two cut portions 22 as shown in FIG. 7, the angle P is defined as an angle between straight lines connecting a center AX of the MCF 1D to neighboring intersections, out of a plurality of intersections between the cut portions 22 and the circumferential portion 21. However, when there is one cut portion 22 as shown in FIG. 6, the angle P is between 90 and 180°. Therefore, as shown in FIG. 6, it is sufficient to measure the outer diameter from three directions (501 to 503, cf. FIG. 6). In the case where the fiber preform to become the MCF 1D is provided with n (≥2) cut portions and is arranged in n-fold rotational symmetry, for example, as shown in FIG. 7, the angle P is set as many as 2n. Supposing there are two cut portions and the angle P is 60° (cf. FIG. 7), it is sufficient to measure the outer diameter from six directions (501 to 506, cf. FIG. 7). When the outer diameter monitor 52 is configured in this manner, any one of a plurality of measurement results includes the maximum outer diameter, or, the result of measurement of the diameter of the circumferential portion of the MCF. Therefore, while a maximum value of the outer diameter measured in this manner is defined as a current outer diameter, a drawing rate or a preform feed rate is adjusted so as to achieve a set target outer diameter, whereby the MCF can be obtained with the outer diameter uniform in the axial direction.

Figure 5:
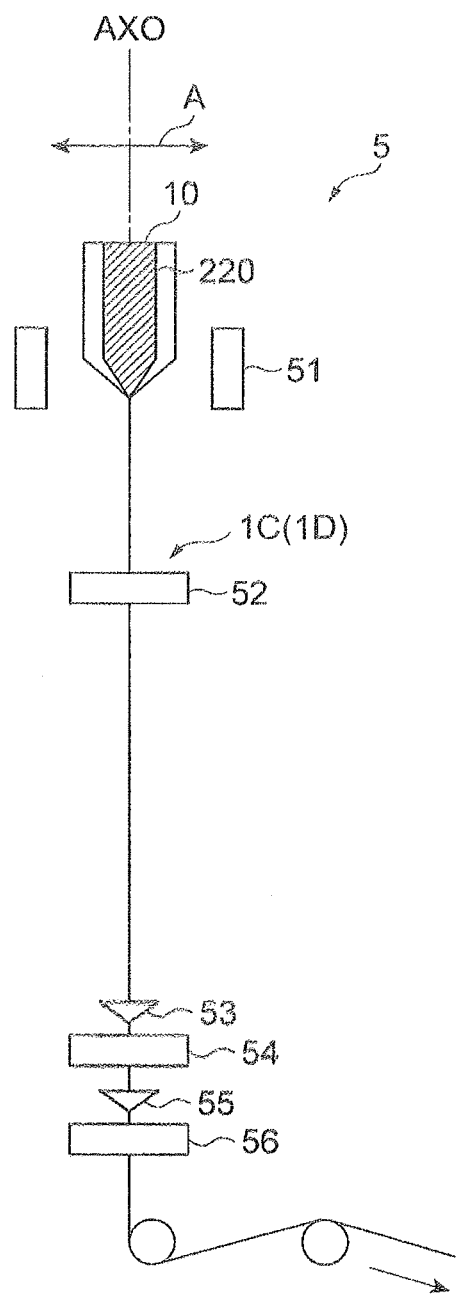
FIG. 5 is a drawing illustrating a drawing device for manufacturing the MCF according to the embodiment of the invention.

In the case of the non-circular MCF in which a part of the outer periphery defining its cross section does not constitute a part of an identical circumference, a heat history in the drawing process becomes asymmetric in the circumferential direction of the preform. In this case, a fiber curl as a curve of the MCF is likely to occur during the drawing. It is therefore desirable to change a circumferential temperature distribution in the drawing furnace in accordance with the outer peripheral shape of the fiber preform 10. For example, as shown in FIG. 5, the curvature of the fiber curl can be regulated by shifting a virtual central axis AX0 of the fiber preform 10 in a direction indicated by arrow A. This can make the radius of curvature of the fiber curl not less than 4 m.

In the case where the fiber preform 10 having the region corresponding to the cut portion 22 including the two contact portions 26 provided in a separated state, is drawn as in the present embodiment, even if deformation occurs in the outer peripheral shape of the MCF (glass portion) because of heat during the drawing, the two points of contact portions 26 will come into contact with any fixing member. It will result in uniquely determining the rotational direction around the predetermined axis AX of the MCF and thus the present embodiment is advantageous over the conventional technologies. The lower the temperature during the drawing, the more the initial shape of the fiber preform 10 is maintained. Therefore, it is preferred in terms of shape control and reproducibility of the drawn MCF that the preform during the drawing be maintained at a low temperature.

This advantage in the manufacturing conditions can be utilized in the manufacturing method of the MCF according to the present embodiment. Namely, the furnace temperature necessary for acquisition of tension can be lowered by slowing down the drawing rate during the drawing. It is desirable from the viewpoint of keeping the outer peripheral shape of the drawn MCF. As the drawing rate decreases, the manufacturing cost of the MCF becomes higher, however. Therefore, the drawing rate is preferably not less than 100 m/min and more preferably not less than 500 m/min.

On the other hand, the tension is desirably as high as possible because the temperature of the fiber preform 10 can be kept low. The tension during the drawing is preferably not less than 100 g and more preferably 150 g. As long as the tension is kept not more than 400 g, a probability of rupture of the MCF during the drawing can be reduced.

Figure 8:
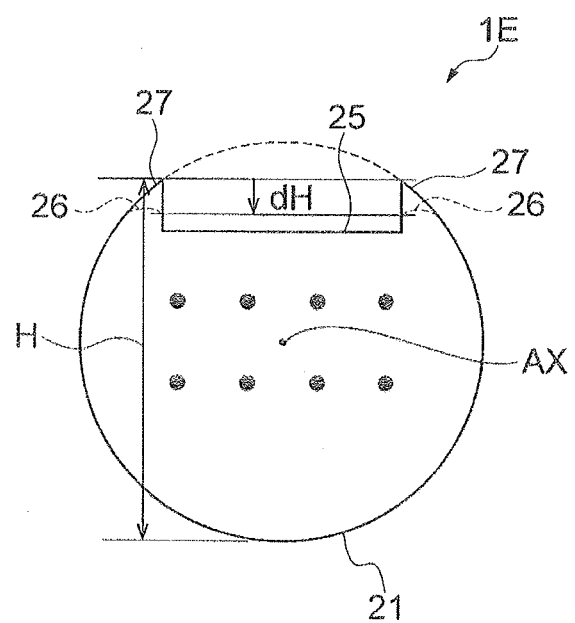
FIG. 8 is a drawing showing definitions of H and dH.

The below will describe an example in which the radius r of curvature of the contact portions 26 in the MCF obtained by the drawing is controlled by processing of the preform before the drawing. In a situation where portions to become the contact portions 26 project outward in the stepped region 220 of the fiber preform 10 as described above, e.g., in a case of a fiber preform 1E, as shown in FIG. 8, in which only the region corresponding to the bottom portion 25 is processed but the regions to become the contact portions are not processed from the circumferential shape, angles between the region processed as the bottom portion 25 and the ends of the circumferential portion 21 (regions 27 to become the contact portions) are acute angles. In this case, the heights of the right and left regions 27 after the drawing can be different due to deformation during the drawing. In this case, there is a possibility that the extending direction of the straight line connecting the regions 27 in the fiber preform 1E in FIG. 8 is a direction different from the array directions of the cores. In FIG. 8, the outer peripheral shape of the fiber preform 1E is indicated by a solid line and, the circumferential portion 21 and the bottom portion 25 of the cut portion 22 in the MCF obtained by the drawing of the fiber preform 1E are shown as superimposed on the outer peripheral shape of the fiber preform 1E. In FIG. 8, the contact portions 26 of the cut portion 22 in the MCF obtained by the drawing of the fiber preform 1E are indicated by dashed lines. Therefore, the outer peripheral shape of the fiber preform 1E is indicated in a reduced form such that its maximum diameter coincides with the maximum outer diameter of the MCF after the drawing.

Then, the Inventors discovered that the radius r of curvature of the flattened faces 260 (cf. FIG. 4A) in the contact portions 26 after the drawing needed to be not less than 10 μm, in order to achieve some degree of accuracy without large inclination of the extending direction of the straight line connecting the contact portions 26 from the array directions of the cores, as to the MCF obtained by the drawing of the fiber preform 1E.

Figure 9:
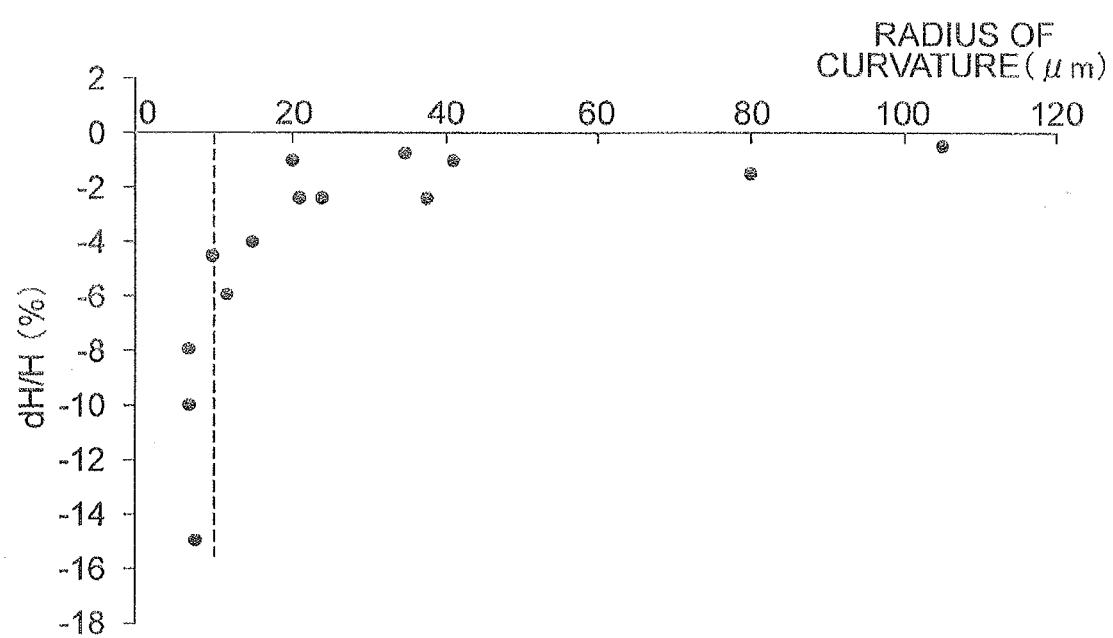
FIG. 9 is a drawing showing the result of measurement of a relationship between radius r of curvature and dH/H.

A method for keeping the radius r of curvature of the flattened faces 260 of the contact portions 26 not less than 10 μm will be described with reference to FIG. 8. In FIG. 8, as described above, the dashed portions indicate the contact portions 26 after the drawing in the present embodiment. Here, H represents a height of an intersection between a perpendicular from the lowest part of the circumferential portion 21 when the fiber preform 1E is arranged so as to make the straight line connecting the regions 27 horizontal, and the straight line connecting the regions 27, with respect to the position of the lowest end of the circumferential portion 21, in the fiber preform 1E with the maximum diameter reduced to the maximum diameter of the MCF after the drawing. Furthermore, dH represents a height (displacement) of the highest point of the contact portions 26 with respect to the height position of the straight line connecting the regions 27, as to the MCF after the drawing. Under the foregoing, FIG. 9 shows the result of investigation of a relationship between the radius r of curvature of the contact portions 26 in the MCF after the drawing and dH/H indicative of the degree of deformation of the fiber preform 1E. As shown in FIG. 9, we found that there was a correlation between dH/H (%) and the radius r of curvature (μm). Then, for making the radius r of curvature not less than 10 μm, the regions 27 to become the contact portions 26 are preferably processed so as to make dH/H not less than −5%. For making dH/H not less than −5%, it is preferred to adjust the fiber preform 1E in the stage of manufacturing it (or to select the manufacturing conditions) so that the apexes of the contact portions 26 (dashed portions) in the MCF after the drawing have target dH, for the reduced other peripheral shape of the fiber preform 1E after processed. For stable manufacture with a large radius of curvature, dH/H is aimed preferably at being not less than −4% and more preferably at being not less than −2%.

In the MCF according to the present embodiment, the jacket portion (coating) 50 is provided on the outer peripheral surface of the drawn glass portion. In the drawing device 5 in FIG. 5, the coating of two or more layers is provided on the outer periphery of the drawn glass portion. The coating, as a specific example, includes a secondary coating layer in contact with the fiber of the glass portion only to prevent external force from being transmitted to the glass fiber portion, and a primary coating layer to prevent the fiber from being damaged.

The drawing can also be performed while controlling a cooling rate of the glass portion. In this case, the surface temperature of the glass fiber at the entrance to the dies can be controlled to a suitable temperature. In a device to control the cooling rate, the fiber is cooled by gas and the Reynolds number of the gas is preferably as low as possible, to reduce vibration due to occurrence of disturbance flow given to the drawn fiber.

The UV furnaces (UV furnaces 54, 56 in FIG. 5) can suitably control a curing rate of the resin by feedback control of the internal temperature, as well as the intensity of UV light. The UV furnaces to be suitably used can be magnetrons and ultraviolet LEDs. When the ultraviolet LEDs are used as the UV furnaces, the light sources do not generate heat, and thus the device is provided with a separate mechanism for introducing hot air to suitably keep the temperature in the furnace. There is a possibility that a component breaking away from the resin adheres to the inner surface of the core tube of the UV furnace to change the UV light power reaching the coating, during the drawing of the fiber preform. Then, the device may also be configured to preliminarily monitor the degree of decrease in UV light power during the drawing and regulate a drawing time so as to keep constant the power of UV light applied to the coating. The device may also be configured to monitor the UV light leaking out of the furnace tube and control the power of UV light applied to the coating at a constant level. It can achieve uniform rupture strength through the entire length of the MCF.

The secondary coating (outside coating) out of the two layers of resin formed as described above is preferably set in an appropriate thickness to hold resistance to external force. In general, an appropriate thickness is preferably not less than 20 µm. In the MCF according to the present embodiment, the glass shape (the contour of the cladding) includes the non-circular portion (the portion to become the cut portion 22), but if the coating is thick, the outer peripheral shape of the coated multi-core optical fiber will become approximately circular. On the other hand, with decrease in thickness of the coating, the glass shape (the shape of the cladding) becomes closer to the outside shape of the coating. For this reason, even in the state of the coated multi-core optical fiber, it becomes easy to align the rotational direction of the MCF. For example, with use of a suitable die or a jig to restrict rotation, we can produce a fiber ribbon in which a plurality of MCFs are aligned in their rotational direction, or a rollable fiber ribbon in which a plurality of MCFs are intermittently connected. If the thickness of the coating 50 is smaller than 20 µm, the resistance to external force will be likely to degrade. Therefore, the thickness of the coating 50 (the thickness of the primary coating and secondary coating) is preferably not less than 20 µm and not more than 50 µm.

The MCF wound up on the bobbin in this way is colored as occasion may demand, and is processed into a primary product such as an optical cable or an optical cord. The MCF processed into the primary product can be used as a product connected with a connection component such as an optical connector to be connected to another optical device as occasion may demand.

Figure 10:
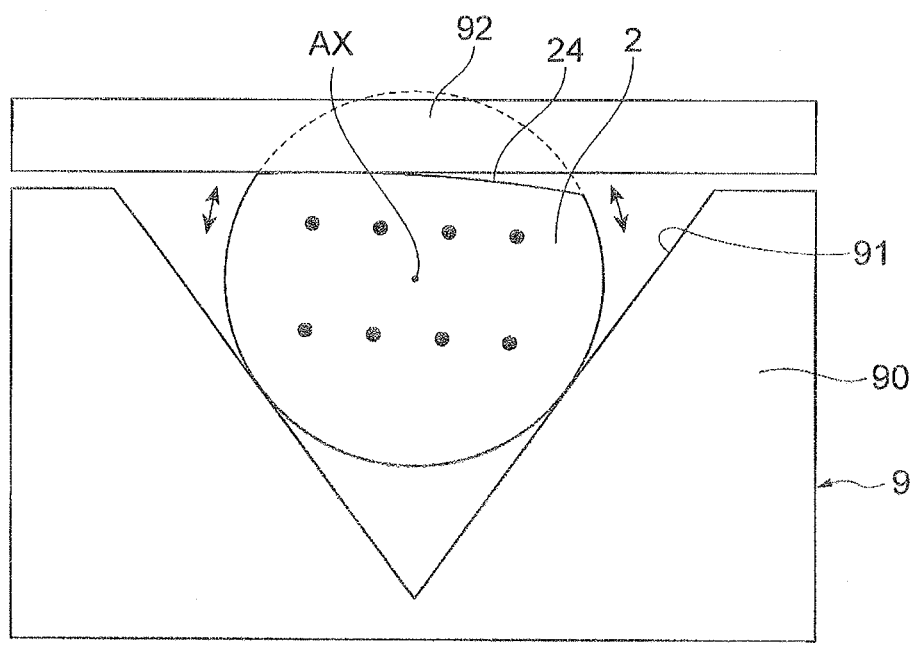
FIG. 10 is a cross-sectional view in a case where the MCF of a comparative example is set in a V-groove coupler.

The effects of the foregoing MCF will be described below. FIG. 10 illustrates a case as a comparative example in which a non-circular MCF 2 with a flat portion 24 formed on the top side is fixed on a V-groove coupler 9 (arrangement component). The MCF 2 is housed in a housing member 90 in which a V-groove 91 is formed, and is fixed by a fixing member 92 of a flat plate from top. When the flat portion 24 is formed as a flat face without curvature, fixing by the fixing member becomes possible. However, it is difficult to form the flat portion 24 as a uniformly flat face because of thermal influence during the drawing as described above. In this case, the fixing is instable even if the MCF 2 is fixed by pressing it from top by the fixing member 92 and it is difficult to accurately perform the rotational alignment (adjustment of the core arrangement by rotating the MCF 2 around the virtual central axis AX thereof).

Figure 11:
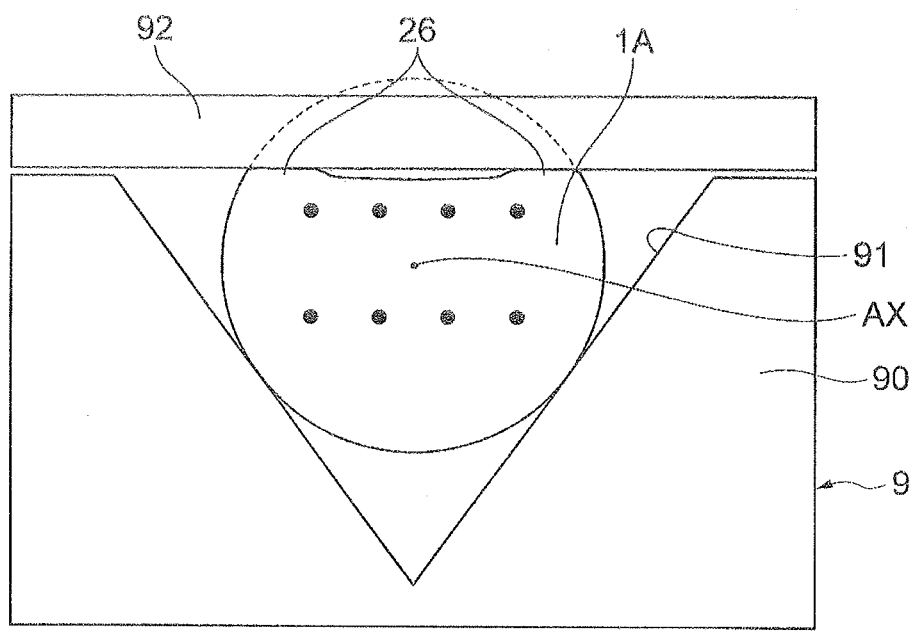
FIG. 11 is a cross-sectional view in a case where the MCF of the embodiment of the invention is set in the V-groove coupler.

On the other hand, when the contact portions 26 are formed as separated at two locations as in the MCF 1A of the present embodiment, the fixing member 92 can press the two contact portions 26, as shown in FIG. 11. In this case, the MCF 1A can be stably housed in the housing member 90. Therefore, the present embodiment enables the rotational alignment to be performed with higher accuracy.

Figure 12:
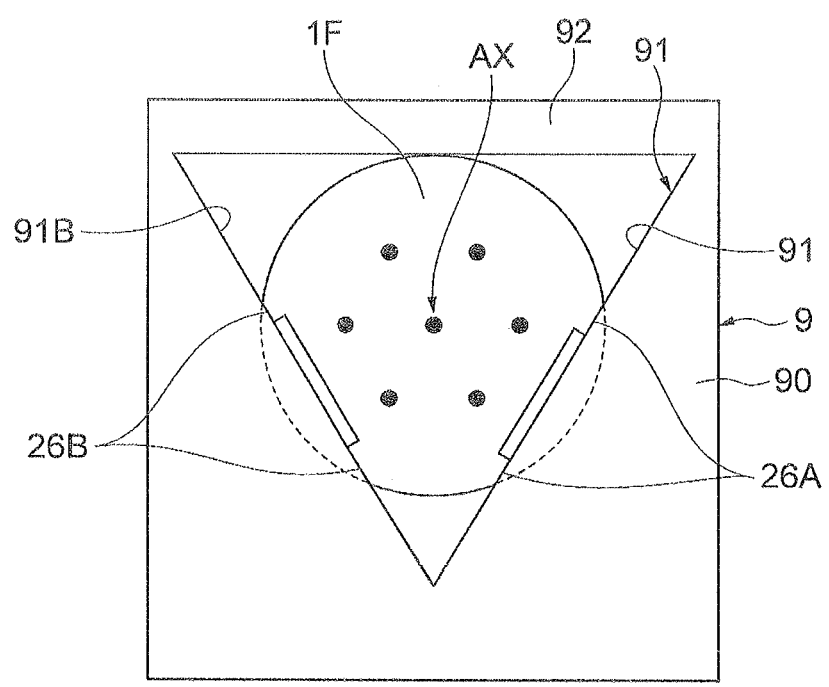
FIG. 12 is a cross-sectional view in a case where the MCF of the embodiment of the invention is set in the V-groove coupler.

The following will describe an example where the MCF has two cut portions 22 and arrangement thereof is not rotationally symmetric. In FIG. 12, the cut portions 22 of the MCF 1F are formed at respective positions along respective faces 91A, 91B forming the V-groove 91 of the housing member 90. This configuration brings the two contact portions 26A of the MCF 1F into contact with the face 91A of the V-groove. Similarly, the two contact portions 26B of the MCF 1F come into contact with the face 91B of the V-groove. In this manner, the MCF 1F can be stably housed against the V-groove 91 and thus the present embodiment allows the MCF to be positioned with higher accuracy.

The below will describe optical modules using the MCF according to the present embodiment as described above. As described above, the MCF according to the present embodiment can be rotationally aligned with higher accuracy. Therefore, an optical module using the MCF aligned in its rotational direction can be readily manufactured.

In an optical module 100 shown in FIG. 13A, two MCFs are connected through a connection 8 and a connector 7 is attached to one end side. FIG. 13B is a drawing showing the cross-sectional shape of the MCF 3 at a site B1 shown in FIG. 13A, and FIG. 13C is a drawing showing the cross-sectional shape of the MCF 1A at a site B2 shown in FIG. 13A. The MCF 3 on the connector 7 side, out of the two MCFs, is a circular MCF with an unprocessed periphery. The MCF 1A on the other side is the MCF with the cut portion 22 described in the above embodiment. The end opposite to the side where the MCF 1A is connected to the connection 8, out of the ends of the MCF 1A, is fixed by the V-groove coupler 9 (arrangement component). Since the MCF according to the present embodiment has the non-circular sectional shape, it is difficult in some cases to fix it to a ferrule having a circular hole. Then, as shown in FIG. 13A, the MCF 3 having the circular outer peripheral shape is used on the connector 7 side, and the MCF 1A is used at the end on the side where the rotational alignment is desired to be easily performed. At the connection 8 the MCF 1A and MCF 3 are subjected to position alignment and then these MCFs are fusion-spliced, obtaining the optical module 100 as shown in FIG. 13A. This allows us to readily perform the rotational alignment of the MCF 1A in the connection operation at the connection 8.

In an optical module 200 shown in FIG. 14A, three MCFs are linearly connected through two connections 8. FIG. 14B is a drawing showing the cross-sectional shape of the MCF 1A at a site C1 shown in FIG. 14A, FIG. 14B is a drawing showing the cross-sectional shape of the MCF 3 at a site C2 shown in FIG. 14A, and FIG. 14D is a drawing showing the cross-sectional shape of the MCF 1A at a site C3 shown in FIG. 14A. Among the three MCFs, the two on both sides are the MCFs 1A having the cut portion 22 according to the present embodiment, and the center MCF 3 is the MCF with the circular outer peripheral shape. The V-groove couplers 9 are provided at the two ends of the optical module 200. In this manner, the MCFs 1A according to the present embodiment are used (the MCFs 1B may also be used) for the MCFs at the ends where the rotational alignment is desired to be readily performed. The intermediate MCF for adjustment of length may also be configured without processing of the outer peripheral shape as occasion may demand. By adopting such a configuration, an optical module using the MCFs with various lengths can be readily manufactured. A connection form between MCFs may be fusion or any other connection form.

The invention claimed is:

1. A multicore optical fiber comprising a plurality of cores and a cladding surrounding each of the plurality of cores,
wherein an outer peripheral shape of the cladding in a cross section perpendicular to a longitudinal direction of the multicore optical fiber is comprised of a circumferential portion forming a circumference coincident with an outer periphery of the multicore optical fiber in the cross section, and a first cut portion, wherein in the cross section defining the outer peripheral shape of the cladding, the first cut portion has a bottom portion and two contact portions provided on both sides of the bottom portion, each of the two contact portions projects in a direction away from the plurality of cores more than the bottom portion, and a minimum value a_min of core-core distance and a minimum distance d_min between the plurality of cores and the circumferential ortion of the claddin satisf the following two conditions:

d_min≤a_min; and d_min/a_min≥0.3, and wherein the two contact portions have respective flattened faces, when a side face of the multicore optical fiber is viewed from a direction perpendicular to the longitudinal direction, and the flattened faces of the two contact portions extend along the longitudinal direction with the bottom portion in between.

2. The multicore optical fiber according to claim 1, wherein the outer peripheral shape of the cladding is a shape partly coincident with or approximate to a virtual circle with a diameter D [μm] equal to a maximum diameter of the multicore optical fiber, the first cut portion has a shape extending along a chord of the virtual circle with a central angle being an angle θ larger than 0° and smaller than 180°, and the circumferential portion has a shape extending along an arc of the virtual circle with a central angle of 360°−θ, wherein the bottom portion in the cross section defining the outer peripheral shape of the cladding has a shape extending along a direction from one end to the other end of the circumferential portion, and each of the flattened faces in the cross section defining the outer peripheral shape of the cladding has a shape extending along the direction from the one end to the other end of the circumferential portion, and wherein in the cross section defining the outer peripheral shape of the cladding, the bottom portion and the flattened faces constituting the first cut portion are arranged so that a maximum separation distance between the bottom portion and the chord of the virtual circle is larger than a maximum separation distance between the flattened faces and the chord of the virtual circle.

3. The multicore optical fiber according to claim 1, wherein in the cross section defining the outer peripheral shape of the cladding, the respective flattened faces of the two contact portions have a radius of curvature of not less than 10 μm.

4. The multicore optical fiber according to claim 1, wherein in the cross section defining the outer peripheral shape of the cladding, a separation distance between the two contact portions is not less than 0.1×D, where D [μm] is a diameter of the circumferential portion equal to a maximum diameter of the multicore optical fiber.

5. The multicore optical fiber according to claim 1, wherein a maximum value of intercore crosstalk in a transmission distance of 30 m is not more than −30 dB and a transmission loss due to a confinement loss is not more than 1 dB/km.

6. The multicore optical fiber according to claim 1, wherein on an outer peripheral surface of the cladding, a second cut portion is provided at a position separated by a predetermined distance from the first cut portion.

7. The multicore optical fiber according to claim 6, wherein the first and second cut portions are arranged at positions where the first and second cut portions are not opposed to each other.

8. The multicore optical fiber according to claim 1, wherein a radius of curvature of a fiber curl is not less than 4 m.

9. The multicore optical fiber according to claim 1, comprising a coating provided on an outer peripheral surface of the cladding, wherein an average thickness of a portion covering the outer peripheral surface of the cladding corresponding to the circumferential portion in the coating is not less than 20 μm and not more than 50 μm.

10. The multicore optical fiber according to claim 1, wherein the cladding has a physical cladding and wherein a marker portion to identify an arrangement of the cores is present in the physical cladding.

11. An optical module having: a first multicore optical fiber comprising a plurality of cores and a cladding surrounding each of the plurality of cores; an arrangement component provided at one end of the first multicore optical fiber, and a second multicore optical fiber connected to the other end different from the one end of the first multicore optical fiber, wherein the first multicore optical fiber is characterized in that (1) an outer peripheral shape of the cladding in a cross section perpendicular to a longitudinal direction of the first multicore optical fiber is comprised of a circumferential portion forming a circumference coincident with an outer periphery of the first multicore optical fiber in the cross section, and a cut portion, (2) in the cross section defining the outer peripheral shape of the cladding, the cut portion has a bottom portion and two contact portions provided on both sides of the bottom portion and projecting in a direction away from the plurality of cores more than the bottom portion, and (3) the two contact portions have respective flattened faces, when a side face of the first multicore optical fiber is viewed from a direction perpendicular to the longitudinal direction, and the flattened faces of the two contact portions extend along the longitudinal direction with the bottom portion in between, wherein the arrangement component has a fixing member having a linear shape, and the fixing member is in contact with the two contact portions, thereby fixing the first multicore optical fiber so that an array direction of the cores is a predetermined direction, and wherein in a cross section perpendicular to a longitudinal direction of the second multicore optical fiber, an outer peripheral shape of the second multicore optical fiber is circular.

12. An optical module having: a first multicore optical fiber in the same structure as the multicore optical fiber as set forth in claim 1; and an arrangement component provided at one end of the first multicore optical fiber, wherein the arrangement component has a fixing member having a linear shape, and the fixing member is in contact with the two contact portions, thereby fixing the multicore optical fiber so that an array direction of a plurality of cores in the first multicore optical fiber is a predetermined direction.

13. A multicore optical fiber comprising a plurality of cores and a cladding surrounding each of the plurality of cores, wherein an outer peripheral shape of the cladding in a cross section perpendicular to a longitudinal direction of the multicore optical fiber is comprised of a circumferential portion forming a circumference coincident with an outer periphery of the multicore optical fiber in the cross section, and a first cut portion, wherein in the cross section defining the outer peripheral shape of the cladding, the first cut portion has a bottom portion and two contact portions provided on both sides of the bottom portion, each of the two contact portions projects in a direction away from the plurality of cores more than the bottom portion, and a separation distance between the two contact portions is not less than 0.1×D, where D [μm] is a diameter of the circumferential portion equal to a maximum diameter of the multicore optical fiber, and wherein the two contact portions have respective flattened faces, when a side face of the multicore optical fiber is viewed from a direction perpendicular to the longitudinal direction, and the flattened faces of the two contact portions extend along the longitudinal direction with the bottom portion in between.

14. The multicore optical fiber according to claim 13, wherein the outer peripheral shape of the cladding is a shape partly coincident with or approximate to a virtual circle with a diameter D [μm] equal to a maximum diameter of the multicore optical fiber, the first cut portion has a shape extending along a chord of the virtual circle with a central angle being an angle θ larger than 0° and smaller than 180°, and the circumferential portion has a shape extending along an arc of the virtual circle with a central angle of 360°−θ, wherein the bottom portion in the cross section defining the outer peripheral shape of the cladding has a shape extending along a direction from one end to the other end of the circumferential portion, and each of the flattened faces in the cross section defining the outer peripheral shape of the cladding has a shape extending along the direction from the one end to the other end of the circumferential portion, and wherein in the cross section defining the outer peripheral shape of the cladding, the bottom portion and the flattened faces constituting the first cut portion are arranged so that a maximum separation distance between the bottom portion and the chord of the virtual circle is larger than a maximum separation distance between the flattened faces and the chord of the virtual circle.

15. The multicore optical fiber according to claim 13, wherein in the cross section defining the outer peripheral shape of the cladding, the respective flattened faces of the two contact portions have a radius of curvature of not less than 10 μm.

16. The multicore optical fiber according to claim 13, wherein on an outer peripheral surface of the cladding, a second cut portion is provided at a position separated by a predetermined distance from the first cut portion.

17. The multicore optical fiber according to claim 16, wherein the first and second cut portions are arranged at positions where the first and second cut portions are not opposed to each other.

18. The multicore optical fiber according to claim 13, wherein a radius of curvature of a fiber curl is not less than 4 m.

19. The multicore optical fiber according to claim 13, comprising a coating provided on an outer peripheral surface of the cladding, wherein an average thickness of a portion covering the outer peripheral surface of the cladding corresponding to the circumferential portion in the coating is not less than 20 μm and not more than 50 μm.

20. The multicore optical fiber according to claim 13, wherein the cladding has a physical cladding and wherein a marker portion to identify an arrangement of the cores is present in the physical cladding.

* * * * *